(12) United States Patent
Sharlin et al.

(10) Patent No.: US 12,099,239 B2
(45) Date of Patent: Sep. 24, 2024

(54) MODIFIED COLOR AND SLOPE MEDIATING LAYER

(71) Applicant: Lumus Ltd., Ness Ziona (IL)

(72) Inventors: Elad Sharlin, Ness Ziona (IL); Tsion Eisenfeld, Ness Ziona (IL); Ronen Chriki, Ness Ziona (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 18/294,836

(22) PCT Filed: May 3, 2023

(86) PCT No.: PCT/IB2023/054603
§ 371 (c)(1),
(2) Date: Feb. 2, 2024

(87) PCT Pub. No.: WO2023/214329
PCT Pub. Date: Nov. 9, 2023

(65) Prior Publication Data
US 2024/0272361 A1 Aug. 15, 2024

Related U.S. Application Data

(60) Provisional application No. 63/338,048, filed on May 4, 2022.

(51) Int. Cl.
*G02B 6/26* (2006.01)
*G02B 27/01* (2006.01)

(52) U.S. Cl.
CPC ............ *G02B 6/26* (2013.01); *G02B 27/0172* (2013.01); *G02B 2027/0178* (2013.01)

(58) Field of Classification Search
CPC .................. G02B 6/26; G02B 27/0172; G02B 2027/0178
See application file for complete search history.

(56) References Cited

U.S. PATENT DOCUMENTS

| 5,096,520 A | 3/1992 | Faris |
| 6,394,607 B1 | 5/2002 | Hashizume et al. |

(Continued)

FOREIGN PATENT DOCUMENTS

| GB | 2153546 A | 8/1985 |
| JP | 2014109717 A | 6/2014 |

(Continued)

OTHER PUBLICATIONS

M. Kivanc Hedili, et al. "Light-efficient augmented reality display with steerable eyebox," Optics Express vol. 27, Issue 9, pp. 12572-12581 (2019) •https://doi.org/10.1364/OE.27.012572.

(Continued)

*Primary Examiner* — Joseph P Martinez
(74) *Attorney, Agent, or Firm* — Renner, Otto, Boisselle & Sklar, LLP

(57) ABSTRACT

An optical system may include (1) a light-guide optical element formed from transparent material and having at least first and second mutually-parallel major external surfaces for supporting propagation of an image by internal reflection, and (2) a mediating layer adjacent at least one of the at least first and second mutually-parallel major external surfaces, the mediating layer configured such that (1) reflectivity, averaged over the visible spectrum, of light coupled into the LOE and transmitted between the at least first and second mutually-parallel major external surfaces at angles below the critical angle is higher than the reflectivity that would have been expected absent the mediating layer and (2) reflectivity of purely white light lies closer to a purely white color point for an angular range from angles below the critical angle to the critical angle than the reflectivity that would have been expected absent the mediating layer.

20 Claims, 9 Drawing Sheets

(56) References Cited

U.S. PATENT DOCUMENTS

| | | |
|---|---|---|
| 6,829,095 B2 | 12/2004 | Amitai |
| 7,573,640 B2 | 8/2009 | Nivon et al. |
| 7,710,655 B2 | 5/2010 | Freeman et al. |
| 9,523,852 B1 | 12/2016 | Brown et al. |
| 9,551,880 B2 | 1/2017 | Amitai |
| 10,302,835 B2 | 5/2019 | Danziger |
| 10,495,849 B2 | 12/2019 | Shin et al. |
| 10,712,567 B2 | 7/2020 | Georgiou et al. |
| 10,859,845 B2 | 12/2020 | Kyosuna et al. |
| 11,067,821 B2 | 7/2021 | Andreev et al. |
| 2007/0097513 A1 | 5/2007 | Amitai |
| 2009/0122414 A1 | 5/2009 | Amitai |
| 2010/0027289 A1 | 2/2010 | Aiki et al. |
| 2010/0033784 A1 | 2/2010 | Renaud Goud |
| 2012/0002256 A1 | 1/2012 | Lacoste et al. |
| 2012/0068609 A1 | 3/2012 | Ide et al. |
| 2013/0021581 A1 | 1/2013 | Takahashi et al. |
| 2013/0335708 A1 | 12/2013 | Ouderkirk |
| 2015/0138451 A1 | 5/2015 | Amitai |
| 2015/0288937 A1 | 10/2015 | Tsai et al. |
| 2015/0338655 A1 | 11/2015 | Sawada et al. |
| 2016/0116739 A1 | 4/2016 | TeKolste et al. |
| 2016/0170213 A1 | 6/2016 | Amitai |
| 2016/0313567 A1 | 10/2016 | Kurashige |
| 2017/0235142 A1 | 8/2017 | Wall et al. |
| 2017/0276947 A1 | 9/2017 | Yokoyama |
| 2017/0371160 A1 | 12/2017 | Schultz |
| 2018/0039082 A1 | 2/2018 | Amitai |
| 2018/0120768 A1 | 5/2018 | Christmas |
| 2018/0129166 A1 | 5/2018 | Seo et al. |
| 2018/0143509 A1 | 5/2018 | Oh |
| 2018/0180892 A1 | 6/2018 | Yoshida |
| 2018/0188532 A1 | 7/2018 | Christmas et al. |
| 2018/0210202 A1 | 7/2018 | Danziger |
| 2018/0262725 A1 | 9/2018 | Fan |
| 2018/0284448 A1 | 10/2018 | Matsuki et al. |
| 2018/0292592 A1 | 10/2018 | Danziger |
| 2018/0321515 A1 | 11/2018 | Cheng et al. |
| 2018/0335629 A1 | 11/2018 | Cheng et al. |
| 2019/0056593 A1 | 2/2019 | Bablumyan |
| 2019/0064518 A1 | 2/2019 | Danziger |
| 2019/0129175 A1 | 5/2019 | Amitai et al. |
| 2020/0183159 A1 | 6/2020 | Danziger |
| 2020/0192095 A1* | 6/2020 | Puetz ................ G02C 7/02 |
| 2020/0209667 A1 | 7/2020 | Sharlin et al. |
| 2020/0278554 A1 | 9/2020 | Schultz et al. |
| 2020/0409151 A1 | 12/2020 | Calafiore |
| 2021/0109351 A1 | 4/2021 | Danziger et al. |
| 2021/0231854 A1 | 7/2021 | Schultz et al. |
| 2022/0197037 A1 | 6/2022 | Pennell et al. |
| 2022/0317467 A1 | 10/2022 | Danziger |
| 2022/0334399 A1 | 10/2022 | Ronen |
| 2022/0342216 A1 | 10/2022 | Danziger et al. |
| 2022/0373807 A1 | 11/2022 | Danziger et al. |
| 2023/0019309 A1 | 1/2023 | Chriki et al. |

FOREIGN PATENT DOCUMENTS

| | | |
|---|---|---|
| JP | 2015099323 A | 5/2015 |
| JP | 2017146494 A | 8/2017 |
| WO | 2021044409 A1 | 3/2021 |
| WO | 2021124315 A1 | 6/2021 |
| WO | 2022180634 A1 | 9/2022 |

OTHER PUBLICATIONS

Lynch, et al. "Beam Manipulation: Prisms vs. Mirrors," Photonik International pp. 45-47. Mar. 2009. Available since Sep. 20, 2016 at the following URL: <http://www.edmundoptics.com/globalassets/resources/articles/beammanipulation-prisms-vs-mirrors-en.pdf> Lynch et al. Mar. 31, 2009 (Mar. 31, 2009).

ZhiTing Ye;Yuan-Heng Cheng;Li-Wei Hung;Kung-Hsieh Hsu;YuChang Hu, "Light Guide Layer Thickness Optimization for Enhancement of the Light Extraction Efficiency of Ultraviolet Light-Emitting Diodes", Nanoscale Research Letters, London, UK, (Jun. 13, 2021), vol. 16, No. 1, doi:10.1186/s11671-021-03563-6, pp. 1-8, XP021292390 [A] 1-20 * entire document * DOI: http://dx.doi.org/10.1186/s11671-021-03563-6.

International Search Report and Written Opinion issued for corresponding International Patent Application No. PCT/IB2023/054603, mailed Aug. 22, 2023.

\* cited by examiner

| deg.[°] | Rs avg. 430-660 nm wl [%] |
|---|---|
| 12 | 4.87 |
| 15 | 5.3 |
| 18 | 5.8 |
| 21 | 6.6 |
| 24 | 7.7 |
| 25 | 8.1 |
| 27 | 9.2 |
| 30 | 11.5 |
| 33 | 15.1 |
| 35 | 18.9 |
| 37 | 25 |
| 39 | 36.3 |
| 40.7 | 62.8 |
| 41.2 | 92.8 |
| 41.218 | 94 |
| 41.248 | 96 |
| 42 | 99.9 |
| 45 | 99.9 |

Air – BK7 Interface Gamut of Reflections of 430-660 nm Light

| deg. [°] | Rs avg. 430-660 nm wt [%] |
|---|---|
| 37 | 0.958 |
| 39 | 1.095 |
| 42 | 1.37 |
| 45 | 1.768 |
| 48 | 2.375 |
| 50 | 2.969 |
| 53 | 4.372 |
| 56 | 7.034 |
| 59 | 13.159 |
| 62 | 37.209 |
| 63 | 87.209 |
| 64 | 100 |
| 65 | 100 |

MODIFIED COLOR AND SLOPE MEDIATING LAYER

This application is a national phase of International Application No. PCT/IB2023/054603 filed May 3, 2023, which claims priority to U.S. Provisional Patent Application No. 63/338,048, filed May 4, 2022, each of which is hereby incorporated herein by reference in its entirety.

FIELD OF THE INVENTION

The present invention relates to optical systems and, in particular, it concerns an optical system for displaying an image to a user, the optical system including a modified color and slope mediating layer for reducing haze effects.

BACKGROUND OF THE INVENTION

Consumer demands for better and more comfortable human computer interfaces have stimulated demand for smaller head mounted displays (HMD) and smart glasses geometry, wider field of view (FOV), longer battery life and day time clear augmented images, etc. Head mounted displays which use waveguides (LOE) to direct an augmented image from a compact projector to the eye of a user show benefits in reducing the overall size of the HMD device. Such displays, however, often exhibit undesirable chromatic haze.

SUMMARY OF THE INVENTION

In one embodiment of the present invention, chromatic haze is mitigated by controlling the reflection intensity and angular dependence of reflection intensity at the optical interfaces within the waveguide coatings on the major surfaces of the LOE.

Light propagating inside a waveguide undergoes differing magnitudes of reflection depending on angle of incidence. It is convenient to define three angular regimes, that of low angles of incidence where low reflection coefficients are desirable (LR regime), intermediate angles of incidence and high angles of incidence. The boundary between the intermediate and high angles of incidence is defined by the critical angle such that all light incident at angles greater than the critical angle will undergo total internal reflection (TIR), hence this angular region may be termed the TIR regime. The intermediate range is characterized by a steep dependence of reflection intensity on angle of incidence.

According to the teachings of an embodiment of the present invention there is provided, an optical system which may include a light-guide optical element formed from transparent material and having at least first and second mutually-parallel major external surfaces for supporting propagation of an image by internal reflection, and a mediating layer adjacent at least one of the first and second mutually-parallel major external surfaces, the mediating layer configured such that (1) reflectivity, averaged over the visible spectrum, of light coupled into the LOE and transmitted between the at least first and second mutually-parallel major external surfaces at angles below the critical angle is higher than the reflectivity that would have been expected absent the mediating layer and (2) reflectivity of purely white light lies closer to a purely white color point for an angular range from angles below the critical angle to the critical angle than the reflectivity that would have been expected absent the mediating layer.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Certain embodiments of the present invention provide an optical system including a light-guide optical element (LOE) for achieving optical aperture expansion for the purpose of a head-up display, and most preferably a near-eye display, which may be a virtual reality display or augmented reality display.

Figure 1:
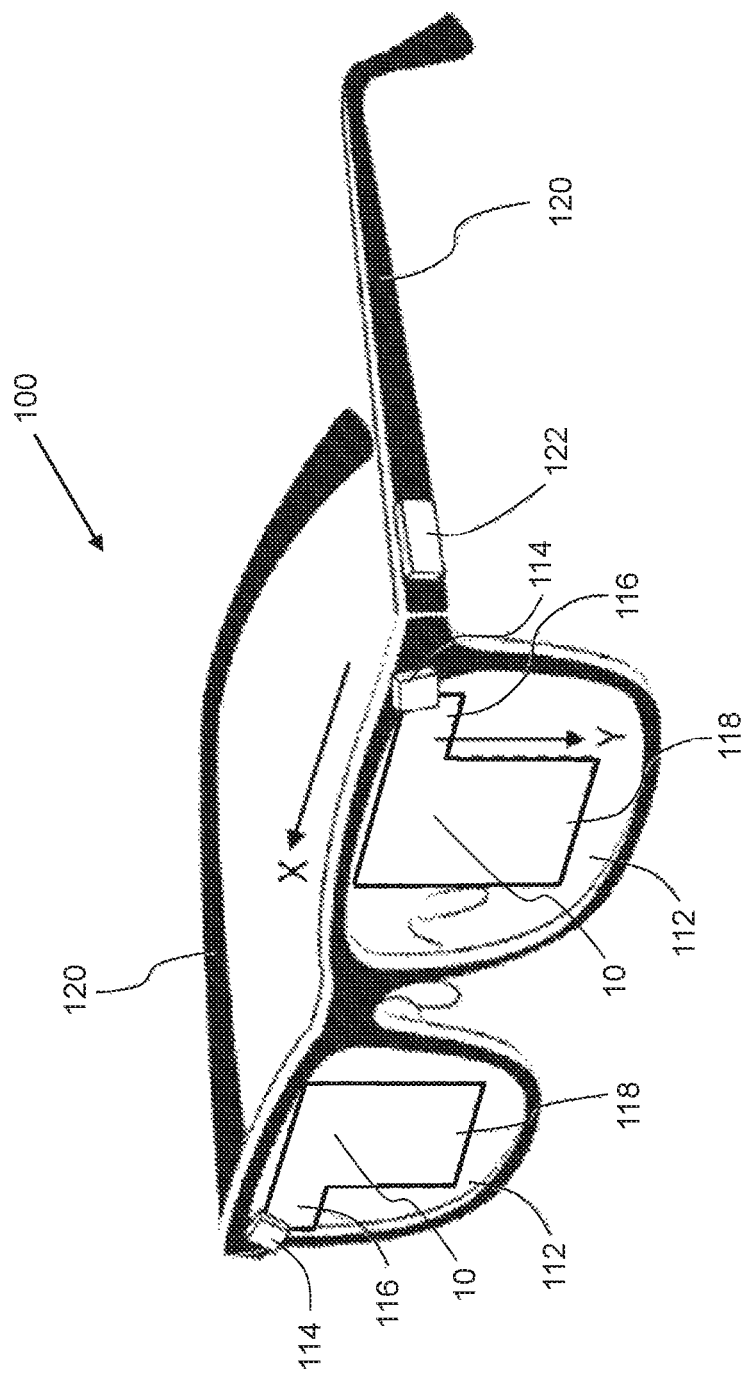
FIG. 1 illustrates a schematic diagram of an exemplary optical system for a near-eye display (NED).

FIG. 1 illustrates an exemplary implementation of a near-eye display device according to the teachings of an embodiment of the present invention, generally designated 100, employing an LOE 10. The near-eye display 100 employs a compact image projector (or "POD") 114 optically coupled so as to inject an image into LOE (interchangeably referred to as a "waveguide," a "substrate" or a "slab") 10 within which the image light is trapped in one dimension by total internal reflection at a set of mutually-parallel planar external surfaces ("major surfaces").

Optical aperture expansion is achieved within LOE 10 by one or more arrangement for progressively redirecting the image illumination, typically employing a set of partially-reflecting surfaces (interchangeably referred to as "facets") that are parallel to each other and inclined obliquely to the direction of propagation of the image light, with each successive facet deflecting a proportion of the image light into a deflected direction. For one-dimensional aperture expansion, the facets also couple-out the image light towards the eye of the user. In some cases, as illustrated here, two-dimensional aperture expansion is achieved by employing a first set of facets in region 116 of LOE 10 to progressively redirect the image illumination within the LOE 10, also trapped/guided by total internal reflection. The deflected image illumination then passes into a second substrate region 118 of the LOE 10, which may be implemented as an adjacent distinct substrate or as a continuation of a single substrate, in which a coupling-out arrangement (for example, a further set of partially reflective facets) progressively couples out a proportion of the image illumination towards the eye of an observer located within a region defined as the eye-motion box (EMB), thereby achieving a second dimension of optical aperture expansion. Similar functionality may be obtained using diffractive optical elements (DOEs) for redirecting and/or coupling-out of image illumination within one or both of regions 116 and 118. Although the following text and figures focus on embedded refractive optical elements, rather than diffractive, this invention applies equally to near eye displays based on diffractive or refractive embedded elements.

The overall device may be implemented separately for each eye and is preferably supported relative to the head of a user with each LOE 10 facing a corresponding eye of the user. In one particularly preferred option as illustrated here, a support arrangement is implemented as a face-mounted set of lenses (e.g., Rx lenses, sunglasses, etc., referred colloquially herein as "eye glasses") with lenses 112 to which the LOE 10 is operably connected and a frame with sides 120 for supporting the device relative to ears of the user. Other forms of support arrangement may also be used, including but not limited to, head bands, visors or devices suspended from helmets.

In the illustrated embodiment, an X axis extends horizontally, in the general extensional direction of the first region of the LOE 10, and a Y axis extends perpendicular thereto, i.e., vertically. In very approximate terms, the first region 116 of LOE 10 may be considered to achieve aperture expansion in the X direction while the second region 118 of LOE 10 achieves aperture expansion in the Y direction.

The near-eye display 100 may include various additional components, typically including a controller 122 for actuating the image projector 114, typically employing electrical power from a small onboard battery (not shown) or some other suitable power source. Controller 122 may include all necessary electronic components such as at least one processor or processing circuitry to drive the image projector.

In the present disclosure, the various features of certain embodiments of the present invention will be illustrated in the context of lenses of eye glasses (as shown in FIG. 1) and, specifically, the interfaces between waveguides and lenses of eye glasses. However, all of the features disclosed herein are equally applicable to any waveguide interface implementation.

Figure 2A:
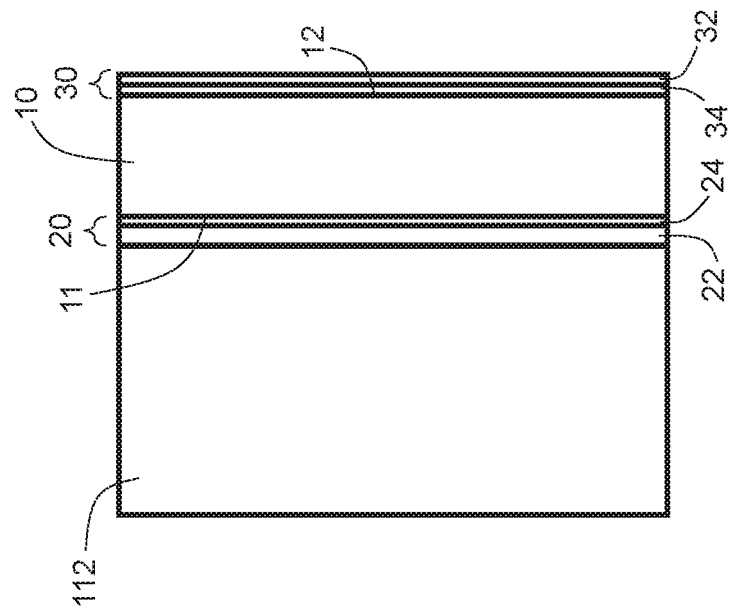
FIGS. 2A and 2B illustrate schematic diagrams of a cross-sectional side view and magnified cross-sectional side view of a lens and LOE for the NED of FIG. 1.
Figure 2B:
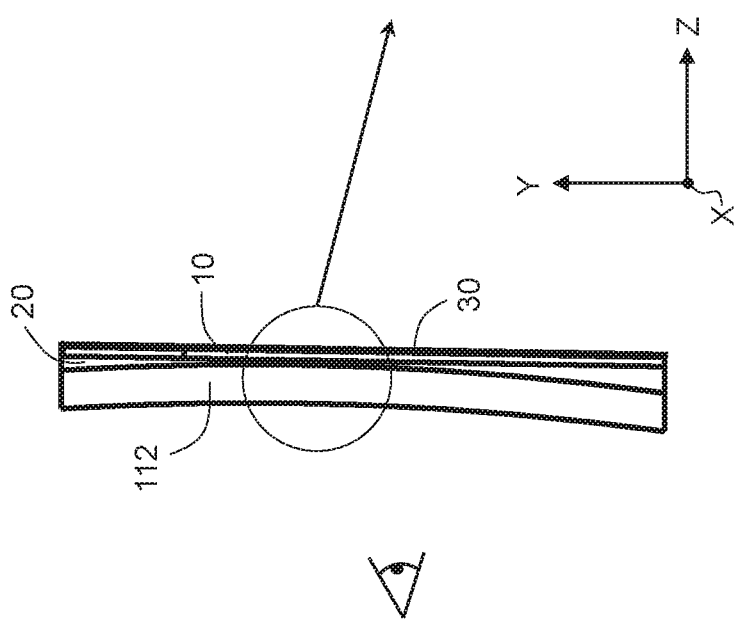

FIGS. 2A and 2B schematically illustrate a possible cross-sectional side view and a magnified cross-sectional side view, respectively, of the LOE 10. Here, the major surface 11 of the LOE 10 is attached to the eye glasses' lens 112 through a mediating layer 20. Another mediating layer 30 is attached to the major surface 12 of the LOE 10. FIGS. 2A and 2B are for illustration purposes and are not to real world scale. The mediating layer 20 insulates the LOE 10 from the lens 112 and serves as a spacer to maintain total internal reflection of the entire image injected to LOE 10. The mediating layer 30 may insulate the LOE 10 from the environment (e.g., air humidity and dirt).

Mediating layers as disclosed herein may be placed on top of or may be part of an optical layer (e.g., low RI adhesive or effective low RI coatings) which would also shift the critical angle for total internal reflection. In those cases, the mediating layers shift the critical angle thereby affecting the angular size that can be used to guide the image inside the LOE 10. However, this is not necessary. In other examples, mediating layers as disclosed herein may be used to accomplish the goals disclosed herein without shifting the critical angle. In summary, mediating layers as disclosed herein may or may not be part of an optical layer which would also shift the critical angle.

Moreover, as shown in FIGS. 2A and 2B, mediating layers may be used between (e.g., to adhere) the isolated waveguide (e.g., LOE 10) and another waveguide or lens. In such cases, the mediating layer may be referred to as an insulation layer or isolation layer, terms that may be more common in the art.

As evident in FIG. 2A, the LOE 10 lies between the lens 112 on one side and air on the other. Similarly, the LOE 10 may also be placed between two lenses or it may be air-spaced on both sides, or it may be bonded to any other material with sufficient contrast in refractive index between the substrate material of the LOE 10.

Figure 2C:
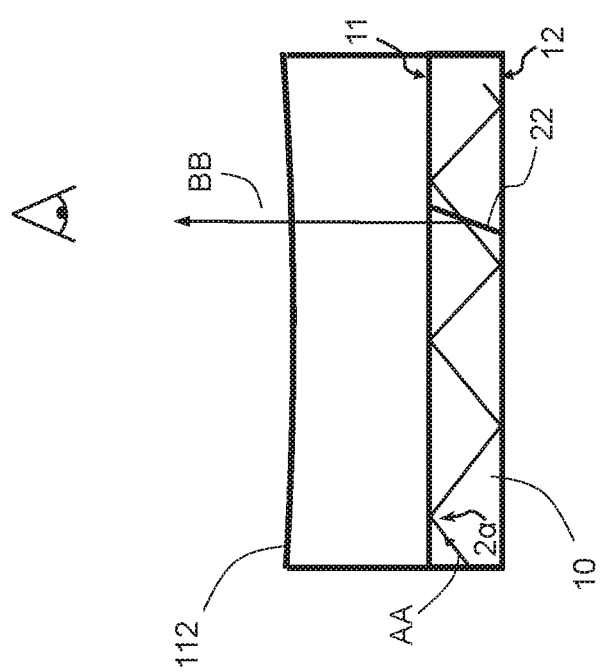
FIG. 2C is a schematic side view of light traveling through the LOE of FIGS. 2A and 2B.

FIG. 2C shows a simplified cross-section of the LOE 10 with a bonded lens 112 on one side of the LOE 10, where a ray AA describing a single field within the guided image. The ray AA forms an angle $\alpha$ with relation to the normal to the LOE major surfaces 11 and 12. Ray AA is reflected by the major surfaces 11 and 12 as it propagates through the waveguide, until it impinges an embedded partially reflective surface 22 which redirects the ray to BB and couples the ray out of the LOE 10 and into the eye box.

The reflectivity on the major surfaces 11 and 12 depends on different parameters, such as wavelength, polarization, and incident angle $\alpha$ of the illuminated light, and is given by the Fresnel equations. The Fresnel equations describe the behavior of the electromagnetic waves at the interface between two medias, which have different (wavelength dependent) refractive indices.

Figure 3A:
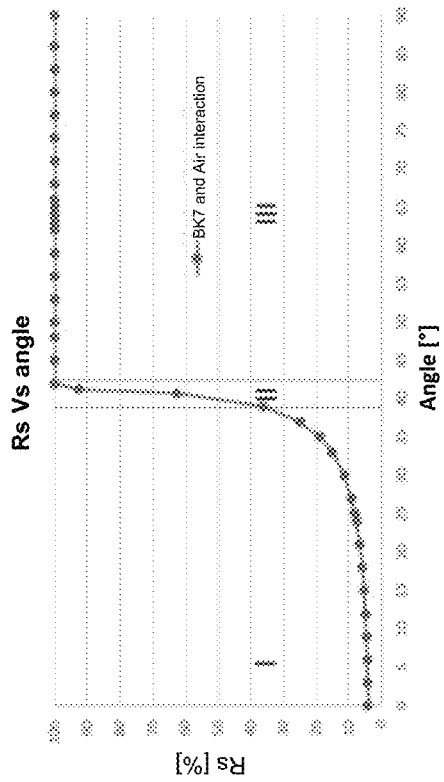
FIG. 3A illustrates a plot of reflective versus angle of incidence for the interface between a glass LOE and air.

FIG. 3A shows an exemplary reflection profile as a function of incident angle for s-polarized light, averaged over the entire visible spectrum. As evident, the profile of reflection may be divided into three sections with relation to the critical angle, $\theta_c$:

I–$\alpha \ll \theta_c$: Leaky angular regime. At low incident angles the reflectivity is low, and therefore light quickly leaks out of the waveguide and cannot be guided in the waveguide.

II–$\alpha \leq \theta_c$: Weakly guided angular regime (Intermediate range). At angles below the critical angle but near the critical angle, reflectivities are relatively high, but below 100% reflectivity, and therefore light is weakly guided in the waveguide.

III—$\alpha > \theta_c$: Guided angular regime. 100% reflection above the critical angle θc. Above the critical angle light undergoes total internal reflection and is guided by the waveguide. Here, the critical angle θc is defined as:

$$\theta c = \sin^{-1} \frac{n_{surroundings}}{n_{LOE}} \qquad \text{Eq. 1}$$

where $n_{surroundings}$ is the refractive index of the cladding or mediating layer (i.e., the lower refractive index medium), and $n_{LOE}$ is the refractive index of the LOE in which the trapped light would travel (i.e., the higher refractive index medium).

Figure 3B:
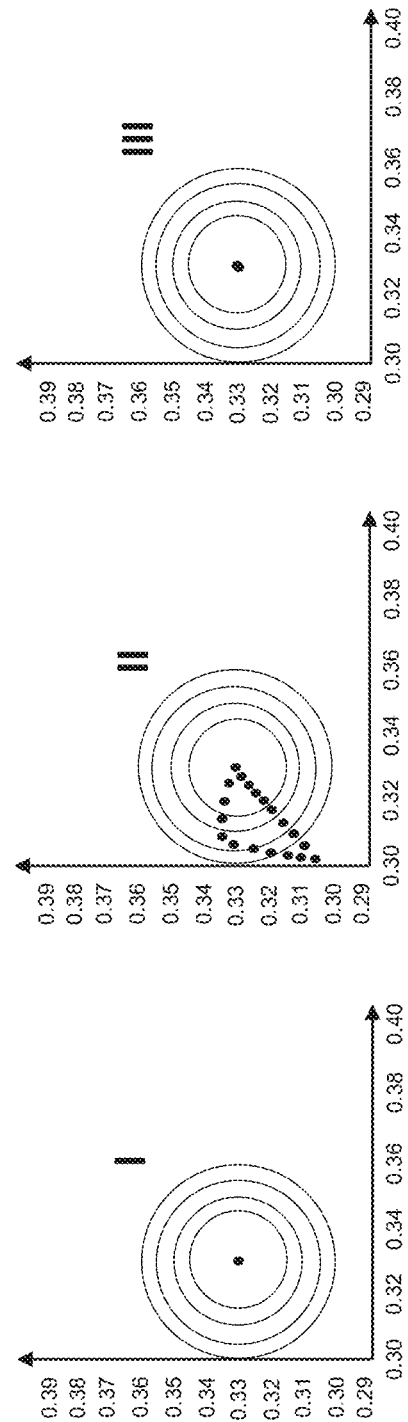
FIG. 3B illustrates a portion of a CIE 1931 XYZ color space gamut showing exemplary reflectance color coordinates for reflections in a waveguide with BK7 glass core and air cladding over different angular ranges for wavelengths 430 to 660 nm.

FIG. 3B illustrates the chromatic properties of these three angular regions by showing the x, y coordinates on a CIE 1931 XYZ color space gamut of light at different incident angles within these regions, for a BK7 substrate waveguide with surrounding air for a uniform distribution of wavelengths between 430 to 660 nm, approximately the visible spectrum. FIG. 3B I shows color coordinates for incident angles of the first angular region ($\alpha << \theta_c$), over the angular range from 0 to 39 degrees. FIG. 3B III shows color coordinates over the third angular regime ($\alpha > \theta_c$), from 42 to 90 degrees. As can be appreciated from FIGS. 3B I and 3B III, these reflections are achromatic, defined as lying within a proximity to a purely white color point (0.333, 0.333). FIG. 3B II shows color coordinates over the second angular range, $\alpha \leq \theta_c$, from 39 to 42 degrees. As can be appreciated from FIG. 3B II, reflections in this angular range are chromatic, they lie further away from the purely white color point (0.333, 0.333).

In a more practical application, imperfections cause deleterious scattering artifacts inside the LOE 10. For example, the LOE 10 may have manufacturing or impact imperfections such as machining imperfections on a surface or chipping on a facet edge. The waveguide may also be dirty. For example, dust or a user's sweat may land on the waveguide's surface. Or stray light might be injected into the waveguide from the projector 114.

Figure 4:
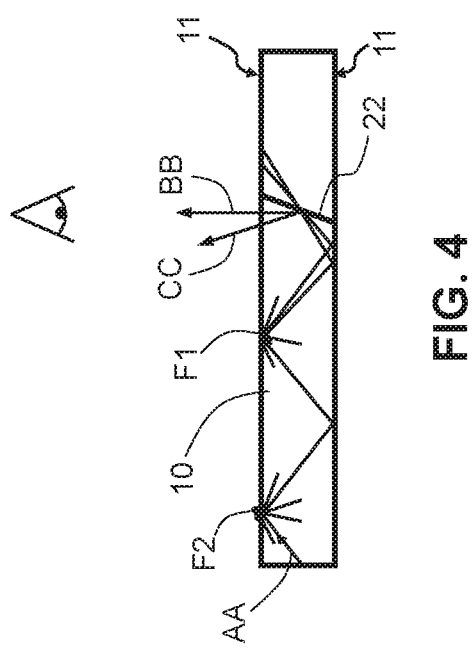
FIG. 4 illustrates an exemplary LOE having flaws or imperfections causing scattering.

FIG. 4 illustrates an exemplary LOE 10, similar to FIG. 2C, but having flaws or imperfections F1 and F2 causing scattering. F1 is an imperfection internal to the LOE 10 while F2 is an imperfection on the surface of the LOE 10. As may be observed from FIG. 4, the imperfections F1, F2 cause part of the light from ray AA to scatter. Part of the deleterious scattered light impinging the LOE 10 in the low reflection range I will leak out. Part of the scattered light will be guided or partially guided inside the LOE 10. The scattered light may impinge on the core-cladding interface in the intermediate angular range II or in the guided angular range III of FIGS. 3A-3B until it eventually reaches the semi reflecting facet 22. From facet 22 it will be partially coupled out of the LOE 10 and into the user's eye as exemplified by ray CC. The scattered light will therefore be observed as a weak background that contaminates the desired image and reduces contrast. As a function of core-cladding reflectance and chromaticity (see FIG. 3A-3B), the scattered light will form chromatic and/or achromatic haze that will be superimposed on the augmented image ray BB.

Although the background haze is undesired, a weak haze may often be acceptable to the human eye, as long as the haze does not suffer from strong intensity gradients or color non-uniformities. Typically, such haze light that is perfectly guided in the waveguide by TIR (angular regime III), will be uniform in intensity and achromatic in nature. However, light that is only weakly guided (angular regime II), may suffer from strong intensity gradients and from color non-uniformities, and would therefore be more prominent and more disturbing to the eye.

Figure 5:
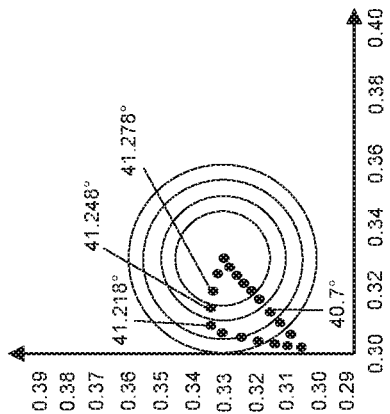
FIG. 5 shows color coordinates (CIE 1931 XYZ color space gamut) over the intermediate angular range II for reflections in a waveguide with BK7 glass core and air cladding for wavelengths 430 to 660 nm.

To see the effect of weakly guided haze, consider a reflectivity $R(\alpha, \lambda) \leq 1$ in the intermediate weakly guided regime II and an incident ray at an angle α with respect to the major surfaces of the LOE 10 and wavelength λ. If the incident light is reflected off the major surfaces N times before being coupled out of the waveguide, the intensity I(α) before being coupled out of the waveguide would be:

$$I(\alpha,\lambda)=I_0 R(\alpha,\lambda)^N \qquad \text{Eq. 2}$$

where $I_0$ is the initial intensity. Here we focus only on effects of reflections from the major surfaces, and ignore other artifacts, such as reflection from different embedded Eq. 3 elements inside the waveguide. The intensity gradient is given by the partial derivatives with respect to field of view (FoV) and wavelength (λ):

$$\frac{\partial I}{I \partial \alpha} = \frac{N}{R}\frac{\partial R}{\partial \alpha} \approx N \frac{\partial R}{\partial \alpha}$$
$$\frac{\partial I}{I \partial \lambda} = \frac{N}{R}\frac{\partial R}{\partial \lambda} \approx N \frac{\partial R}{\partial \lambda}$$

where we neglected the dependence of N on a and used the approximation R≈1 on the right equality side, which is valid near the critical angle. We therefore conclude that the normalized partial derivatives of the reflectivity are enhanced by factor N in the normalized partial derivatives of the intensity. N is typically on the order of few tens and the reflectivity is usually sensitive to incident angle and wavelength in the near vicinity of incident angles to the critical angle (below the critical angle) and, thus, the gradient of the intensity I is sensitive to incident angle and also to wavelength. FIG. 5 shows color coordinates (CIE 1931 XYZ color space gamut) over the intermediate angular range II for reflections in a waveguide with BK7 glass core and air cladding for wavelengths 430 to 660 nm. As can be appreciated from FIG. 5, in the angular range of 12 to 39 degrees the scattered light will be achromatic, in the angular range 40.7 to 41.2 degrees the scattered light will be chromatic (i.e., reflections lie further away from the purely white color point (0.333, 0.333)), and in the angular range 41.248 to 45 degrees the scattered light will be achromatic again. Furthermore, when the glass/air reflectance is low (lower part of the Leaky angular regime I of FIG. 3A) the scattered light will decay rapidly and will not reach the eye of the user. The chromatic/achromatic and intensity profile of the intermediate range II dictates the profile of the received haze.

In the consumer product AR glasses of FIG. 1, the LOE 10 is integrated with the optical lens 112. As shown in FIGS. 2A and 2B, the mediating layer 20 may be implemented between the lens 112 and LOE 10 and the mediating layer 30 may be implemented between the LOE 10 and the environment. Considering all of the above, the mediating layers 20, 30 may be designed to support, not only low reflection in low angles and high reflection in high angles (i.e., support TIR), but may also be designed to solve the issue of chromatic haze and, in an embodiment, the mediating layers 20, 30 may be designed to control the reflection intensity at the core (LOE)—cladding (environment) interface. For this case, we introduce here the modified color and slope mediating layers (MCSML) 20, 30. Looking at the broader case, a higher RI waveguide held in a lower RI surrounding will typically suffer from unwanted haze and will need an MCSML solution to manage it.

In the arrangement of FIG. 1, an adhesive adheres the LOE 10 to the lens 112. Such arrangement absent an MCSML would tend to exhibit chromatic haze to the user's eye as a result of imperfections (e.g., chipping, dust, sweat, etc.), as described above. The MCSML 20, 30 make any haze of the overall LOE 10 more acceptable by modifying reflectivity in the intermediate range II versus reflectivity of the prior art adhesive/insulation layer. Moreover, the MCSML 20, 30 modify reflections in the intermediate range II versus the prior art adhesive/insulation layer such that the modified reflections are substantially achromatic and such that the reflection intensity at the core (LOE) cladding (environment) interface does not vary too much as a function of the incident angle below the critical angle.

Figure 6:
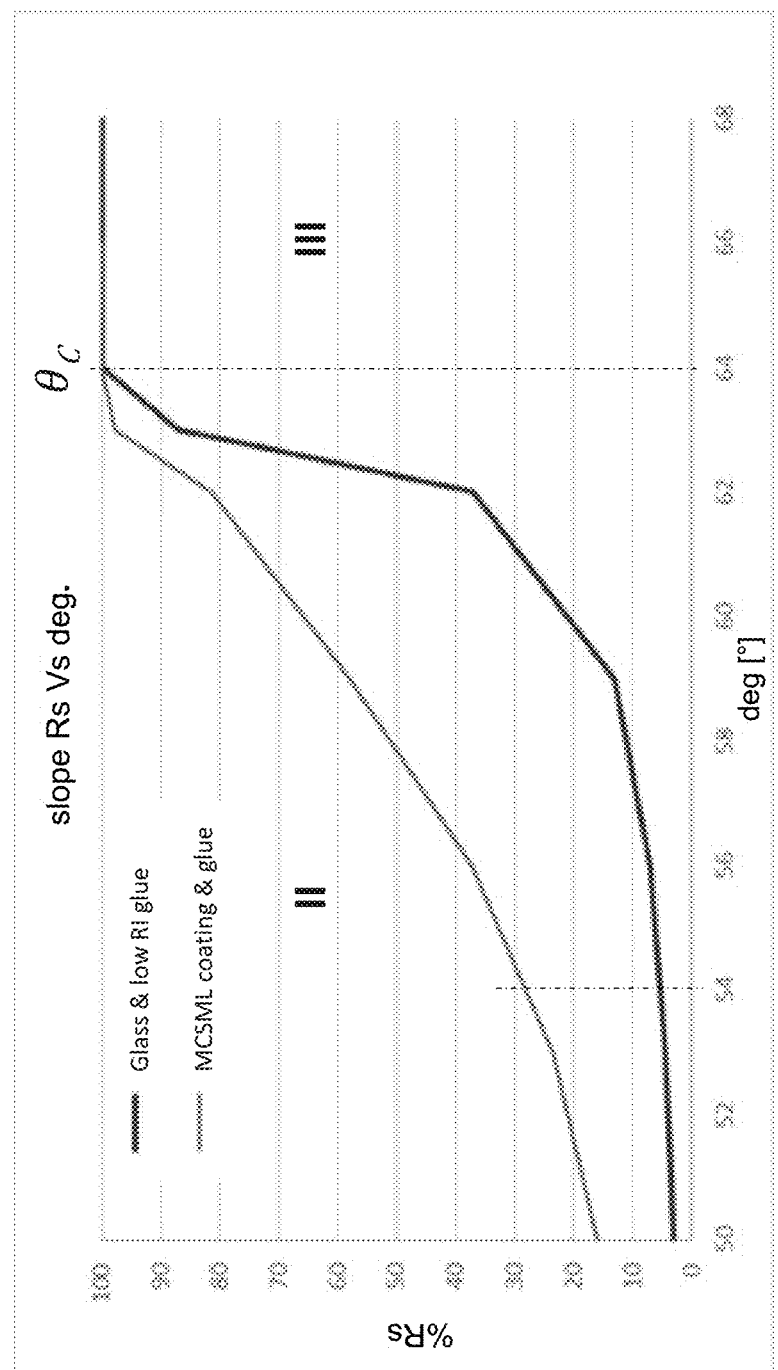
FIG. 6 illustrates a first plot of reflectivity versus incidence angle at the interface between a BK7 glass waveguide (Glass) and a low-refractive index adhesive (low RI glue) including the intermediate region II and a second plot of reflectivity versus incidence angle at the interface between a BK7 glass waveguide and the MCSML.

FIG. 6 illustrates a first plot of reflectivity versus incidence angle at the interface between a BK7 glass waveguide (Glass) and a low-refractive index adhesive (low RI glue) including the intermediate region II. FIG. 6 also illustrates a second plot of reflectivity versus incidence angle at the interface between a BK7 glass waveguide and the MCSML 20. As can be seen from FIG. 6, the MCSML 20, 30 modify the slope of the intermediate range II to increase reflectivity, averaged over the visible spectrum, of light coupled into the LOE 10 and weakly trapped between the major external surfaces at angles θ near the critical angle $\theta_C$, $\theta<\theta_C$. Thus, the MCSML 20, 30 reflections are larger than the reflections that would have been expected absent the MCSML 20, 30. In one embodiment, the MCSML 20, 30 modify the slope of the intermediate range II such that reflectivity, averaged over the visible spectrum, of light coupled into the LOE 10 and weakly trapped between the major external surfaces at angles 10 degrees below the critical angle $\theta_C$ is at least 10%, 15%, 20%, or 25%. For example, as can be seen from FIG. 6, with the MCSML 20, 30, reflectivity at 54 degrees (approximately 10 degrees below the critical angle $\theta_C$=64 degrees) is higher than 20%. This modification of the slope of the intermediate range II makes the haze of the overall LOE 10 more acceptable.

Figure 7A:
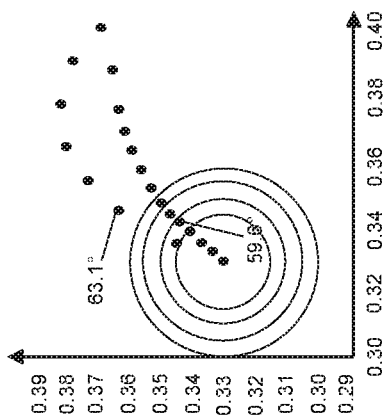
FIG. 7A shows color coordinates (CIE 1931 XYZ color space gamut) over the intermediate angular range II for reflections in a waveguide with BK7 glass core and a low-refractive index adhesive (low RI glue) for wavelengths 430 to 660 nm.
Figure 7B:
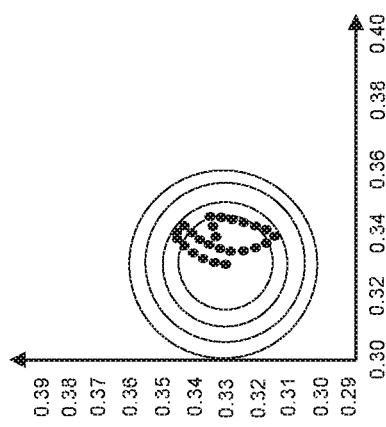
FIG. 7B shows color coordinates over the intermediate angular range II for reflections in a waveguide with BK7 glass core with the MCSML.

FIG. 7A shows color coordinates (CIE 1931 XYZ color space gamut) over the intermediate angular range II for reflections in a waveguide with BK7 glass core and a low-refractive index adhesive (low RI glue) for wavelengths 430 to 660 nm. As can be appreciated from FIG. 7A, scattered light will be chromatic (i.e., reflections lie further away from the purely white color point (0.333, 0.333)) for the intermediate angular range approximately between 59.6 and 63.1 degrees. FIG. 7B shows color coordinates over the same intermediate angular range II for reflections in a waveguide with BK7 glass core with the MCSML 20, 30. As can be appreciated from FIG. 7B, the MCSML 20, 30 modify the reflections in the intermediate range II versus the prior art adhesive/insulation layer such that the modified reflections are substantially achromatic (i.e., reflections lie with proximity to the purely white color point (0.333, 0.333)).

Thus, in one embodiment, for reflections in the waveguide with BK7 glass core with the MCSML 20, 30 for an angular range from the angle 10 degrees below the critical angle to the critical angle $\theta_C$, reflectivity of purely white light lies in a CIE 1931 XYZ color space or gamut closer to a purely white color point (0.333, 0.333) than for reflections in the same waveguide without the MCSML 20, 30. For example, in one embodiment, for reflections in the waveguide with BK7 glass core with the MCSML 20, 30, reflectivity of purely white light lies in a CIE 1931 XYZ color space or gamut within a 0.01 or 0.015 or 0.02 or 0.025 or 0.03 or 0.035 or 0.04 color radius from a purely transmitted white color point (0.333, 0.333) for an angular range from the angle 10 degrees below the critical angle to the critical angle $\theta_C$. Such reflectivity is considered generally achromatic when compared to, for example, the reflectivity displayed in FIG. 7A.

From a coating design perspective, different solutions can be envisaged, but it is often beneficial to use (1) a low refractive index (RI) material for the demands of the TIR range III and (2) a multi-layer coating for the antireflecting range I (low degree) and slope to TIR (intermediate) range II.

In reference to FIG. 2B, two different combinations of low RI index material and multi-layer coating may be used for the mediating layers 20 and 30. The mediating layer 20, disposed between the LOE 10 and the lens 112 may include a glue 22 that may simultaneously serve as the low RI material and the adhesive that operably connects the LOE 10 to the lens 112. On the other hand, the mediating layer 30, disposed between the LOE 10 and the environment (e.g., air) may include a multilayer low RI coating 32 as the low RI material. Each of the mediating layers 20 and 30 also includes a multilayer coating 24, 34 to attend to the antireflecting range I (low degree) and slope to TIR (intermediate) range II. Although the various layers are disclosed herein in a particular layer stacking order, the present invention is not limited to any particular order of the layers and, therefore, the order of the layers may vary.

In one embodiment, the low RI material 32 (for example, $MgF_2$ having a refractive index of approximately 1.38 or $AlF_3$ having a refractive index of approximately 1.36) may be a thick coat layer with optical thickness (optical thickness=physical thickness×refractive index) of above 700 nm while the low RI material 22 may be a thick (0.5 μm to 100 μm) low RI index glue (Norland Optical Adhesive having a refractive index of approximately 1.34). Other candidates for low RI index glue may include NOA adhesives as well as epoxies, acrylics, and silicones, which may be selected based on their specific (low) refractive index, adhesive strength, and other properties.

While the thickness of a thin coating is well controlled, the thickness of a glue (adhesive) material is generally harder to control and can often vary substantially from one sample to the next or between products. Accordingly, it is difficult to design and control well the chromaticity and angular reflectivity profiles of a glue. Due to coherence artifacts, thin layers of glue may suffer from angle and wavelength sensitive profiles, which may lead to chromatic artifacts in the background haze, as discussed above. Therefore, it may be advantageous to design and fabricate such layers of glue that are thick compared to the coherence length of the illumination sources. In one embodiment, the low RI adhesive layer 22 is thicker than half a coherence length of the illumination source (e.g., POD 114) to the optical system. Such thick layers would generally smooth-out coherent artifacts and allow better control the chromatic properties of the background haze.

Figure 8:
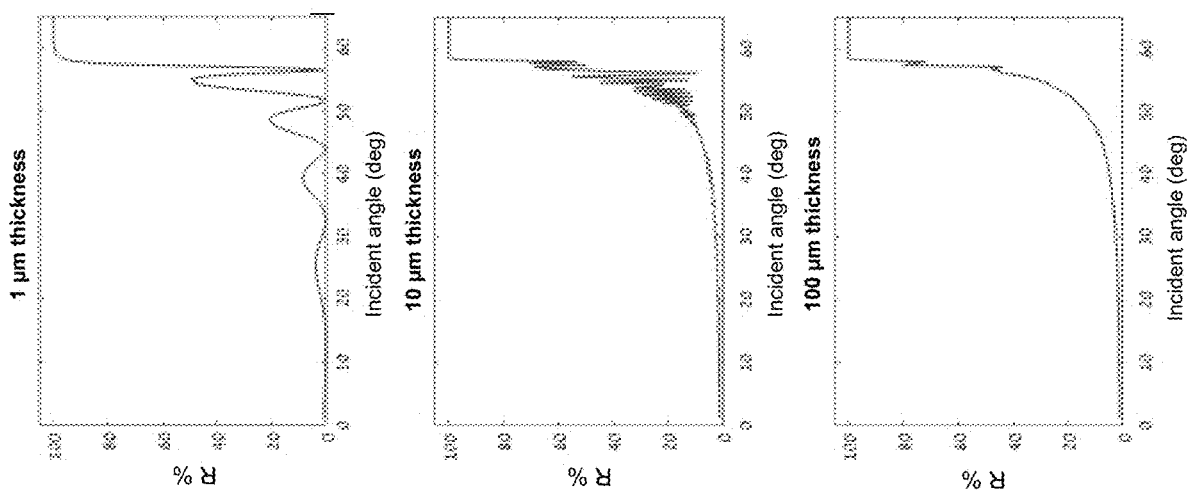
FIG. 8 shows three plots illustrating the effect of coherence length vs. layer of thickness of adhesive glue.

The effect of coherence length vs. layer of thickness of the adhesive glue is demonstrated in FIG. 8, which shows the expected reflectivity at the interface between the BK7 glass layer of LOE 10 and the low RI adhesive 22, when illuminated with a green source with a uniform spectral bandwidth of 20 nm between 520 nm and 540 nm wavelength. As evident from FIG. 8, changing the thickness of the adhesive (from 1 μm to 10 μm and to 100 μm) has a strong effect on the expected overall reflectivity.

Using the low RI glue 22 is favorable for meeting TIR range demands as it reduces overall requirements from the multilayer coating 24. In general, as the angular range over which the coating needs to support a certain performance specification increases, the optical performance of the coating may be reduced. This is because, in order to achieve a certain level of performance over a larger angular range, a more complex and thicker coating may be required. On the other hand, if the angular range over which the coating needs to support a certain performance specification is smaller, a simpler and thinner coating may be sufficient to achieve the desired performance. As the multilayer coating 24 needs to support a smaller angular range, using low RI glue 22 simplifies the coating 24 and reduces its overall optical thickness from approximately ~3 μm to approximately ~0.5 μm and reduces its layer number in ~33%. When the MCSML 20 is implemented on an already pristine full facet LOE 10, reducing the overall coating thickness and number of layers needed allows higher yield, higher production cycles and lower stress/curvature etc.

In another embodiment, a layer of adhesive or coating with a refractive index that is close to that of the LOE 10 (index-matched layer) is placed on top of the LOE 10 before the low RI material 22, 32. An index-matched layer (IML) is a thin layer of material that is applied to the surface of a waveguide in a near eye display. The purpose of the IML is to reduce the amount of light that is reflected at the interface, which can cause unwanted glare and reduce the contrast and brightness of the display. The IML may be made of a material that has a refractive index that matches that of the LOE 10, which allows the IML to act as a buffer layer at the interface. By matching the refractive index of the IML to that of the LOE 10, the IML can help reduce the amount of light that is reflected at the interface. This can result in a display with higher contrast and brightness, and less glare. In addition to reducing reflections, an IML can also help to mitigate issues such as scattering, which can occur when light is scattered by imperfections in the waveguide surface. By filling in these imperfections with a material that has the same refractive index as the waveguide, the IML can help to reduce scattering and improve image quality. In this arrangement, the IML may minimize the effect of scattering caused by imperfections of the LOE 10 and may reduce the overall haze and improve image contrast.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. An optical system for directing an image towards a user for viewing, the optical system comprising:
   a light-guide optical element (LOE) formed from transparent material and having at least first and second mutually-parallel major external surfaces for supporting propagation of light corresponding to an image by total internal reflection when an angle of incidence of the light on the first and second major external surfaces is greater than a critical angle, the LOE having a coupling-in arrangement for coupling in the image into the LOE and a coupling-out arrangement for coupling out the image towards an eye of the user; and
   a mediating layer adjacent at least one of the at least first and second mutually-parallel major external surfaces, the mediating layer configured such that reflectivity, averaged over the visible spectrum, of light coupled into the LOE and transmitted between the at least first and second mutually-parallel major external surfaces at an angle 10 degrees below the critical angle, is at least 10% or higher, and reflectivity of purely white light lies in a CIE 1931 XYZ color space or gamut closer to a purely transmitted white color point (0.333, 0.333) for an angular range from the angle 10 degrees below the critical angle to the critical angle than the reflections that would have been expected absent the mediating layer.

2. The optical system of claim 1, wherein the mediating layer includes:
   a low refractive index adhesive layer having a thickness of between 0.5 μm and 100 μm.

3. The optical system of claim 2, comprising:
   an illumination source configured to generate the image, wherein the low refractive index adhesive layer is thicker than half a coherence length of the illumination source.

4. The optical system of claim 1, the mediating layer comprising at least one of:

a low refractive index multilayer coating layer that has an optical thickness of above 700 nm, and an index match layer disposed between the mediating layer and the at least one of the at least first and second mutually parallel major external surfaces.

5. The optical system of claim 1, wherein reflectivity of the purely white source lies in the CIE 1931 XYZ color space or gamut within a 0.04 color radius from the purely transmitted white color point (0.333, 0.333) for the angular range of from 10 degrees below the critical angle to the critical angle.

6. An optical system for directing an image towards a user for viewing, the optical system comprising:

a light-guide optical element (LOE) formed from transparent material and having at least first and second mutually-parallel major external surfaces for supporting propagation of light corresponding to an image by total internal reflection when an angle of incidence of the light on the first and second major external surfaces is greater than a critical angle $\theta_C$, the LOE having a coupling-in arrangement for coupling in the image into the LOE and a coupling-out arrangement for coupling out the image towards an eye of the user; and a mediating layer adjacent at least one of the one of the at least first and second mutually-parallel major external surfaces, the mediating layer configured such that reflections, averaged over the visible spectrum, of light coupled into the LOE and transmitted between the at least first and second mutually-parallel major external surfaces at angles $\theta$ near the critical angle $\theta_C$, $\theta<\theta_C$, are larger than reflections that would have been expected absent the mediating layer.

7. The optical system of claim 6, wherein at an angle 10 degrees below the critical angle $\theta_C$, reflectivity is at least 10%.

8. The optical system of claim 6, wherein the mediating layer includes:

a low refractive index adhesive layer having a thickness of between 0.5 μm and 100 μm.

9. The optical system of claim 8, wherein the low refractive index adhesive layer is thicker than half a coherence length of an illumination source to the optical system.

10. The optical system of claim 6, wherein the mediating layer includes:

a low refractive index multilayer coating layer having an optical thickness of above 700 nm.

11. The optical system of claim 6, wherein the mediating layer includes:

a multilayer coating layer disposed adjacent the at least one of the at least first and second mutually-parallel major external surfaces such that reflectivity of a purely white source lies in a CIE 1931 XYZ color space or gamut within a 0.04 color radius from a purely transmitted white color point (0.333, 0.333) for the angular range of from 10 degrees below the critical angle to the critical angle.

12. The optical system of claim 10, wherein the mediating layer includes an index match layer disposed between the mediating layer and the at least one of the at least first and second mutually-parallel major external surfaces.

13. An optical system for directing an image towards a user for viewing, the optical system comprising:

a light-guide optical element (LOE) formed from transparent material and having at least first and second mutually-parallel major external surfaces for supporting propagation of light corresponding to an image by total internal reflection when an angle of incidence of the light on the first and second major external surfaces is greater than a critical angle, the LOE having a coupling-in arrangement for coupling in the image into the LOE and a coupling-out arrangement for coupling out the image towards an eye of the user; and a mediating layer adjacent at least one of the at least first and second mutually-parallel major external surfaces, the mediating layer configured such that reflectivity of a purely white source lies in a CIE 1931 XYZ color space or gamut within a 0.04 color radius from a purely transmitted white color point (0.333, 0.333) for an angular range from the angle 10 degrees below the critical angle to the critical angle.

14. The optical system of claim 13, wherein the mediating layer includes:

a low refractive index adhesive layer having a thickness of between 0.5 μm and 100 μm.

15. The optical system of claim 14, comprising:

an illumination source configured to generate the image, wherein the low refractive index adhesive layer is thicker than half a coherence length of the illumination source.

16. The optical system of claim 13, wherein the mediating layer includes:

a low refractive index multilayer coating layer having an optical thickness of above 700 nm.

17. The optical system of claim 13, comprising:

an index match layer disposed between the mediating layer and the at least one of the at least first and second mutually-parallel major external surfaces.

18. An optical system for directing an image towards a user for viewing, the optical system comprising:

an illumination source configured to generate an image;

an optical lens having at least first and second major external surfaces;

a light-guide optical element (LOE) formed from transparent material and having at least first and second mutually-parallel major external surfaces for supporting propagation of light corresponding to the image by total internal reflection when an angle of incidence of the light on the first and second major external surfaces is greater than a critical angle, the LOE having a coupling-in arrangement for coupling in the image into the LOE and a coupling-out arrangement for coupling out the image towards an eye of the user, the LOE disposed adjacent the optical lens with one of the at least first and second mutually-parallel major external surfaces facing one of the at least first and second major external surfaces of the optical lens;

a mediating layer disposed between the optical lens and the LOE adjacent one of the at least first and second mutually-parallel major external surfaces and the at least first and second major external surfaces of the optical lens, the mediating layer configured such that reflections, averaged over the visible spectrum, of light coupled into the LOE and transmitted between the at least first and second mutually-parallel major external surfaces at angles $\theta$ near the critical angle $\theta_C$, $\theta<\theta_C$, are larger than reflections that would have been expected absent the mediating layer, and reflectivity for purely white light lies in a CIE 1931 XYZ color space or gamut within a 0.04 color radius from a purely transmitted white color point (0.333, 0.333) for an angular range from the angle 10 degrees below the critical angle to the critical angle.

19. The optical system of claim 18, wherein the mediating layer includes:

a low refractive index adhesive layer having a thickness of between 0.5 μm and 100 μm, wherein the low refractive index adhesive layer is thicker than half a coherence length of the illumination source.

20. The optical system of claim 18, wherein the mediating layer includes:
a low refractive index multilayer coating layer having an optical thickness of above 700 nm.

* * * * *